United States Patent [19]

Tashiro

[11] Patent Number: 5,402,103
[45] Date of Patent: Mar. 28, 1995

[54] AUTOMOTIVE WINKER DEVICE

[76] Inventor: Tadao Tashiro, 4-8-20, Namiki, Kawaguchi-shi, Saitama-ken, Japan

[21] Appl. No.: 892,264

[22] Filed: Jun. 2, 1992

[30] Foreign Application Priority Data

Jun. 13, 1991 [JP] Japan .................. 3-053014 U

[51] Int. Cl.6 ............................................. B60Q 1/00
[52] U.S. Cl. ................... 340/475; 340/468; 362/83.1; 362/135; 359/844
[58] Field of Search ............... 340/468, 475; 362/83.1, 362/135; 359/844

[56] References Cited

U.S. PATENT DOCUMENTS

| | | | |
|---|---|---|---|
| 3,266,016 | 8/1966 | Maruyama et al. | 362/83.1 |
| 4,475,100 | 10/1984 | Duh | 362/83.1 |
| 5,014,167 | 5/1991 | Roberts | 340/475 |
| 5,059,015 | 10/1991 | Tran | 340/475 |
| 5,109,214 | 4/1992 | Heidman, Jr. | 340/475 |
| 5,178,448 | 1/1993 | Adams et al. | 362/83.1 |

Primary Examiner—John K. Peng
Assistant Examiner—Edward Lefkowitz
Attorney, Agent, or Firm—Frishauf, Holtz, Goodman & Woodward

[57] ABSTRACT

An automotive winker device comprises a light source accommodated in a light source chamber defined in a cover case of a door mirror or a side view mirror. Light transmission holes with transparent plates are provided in the light source chamber to project light rearwardly and sideways of the vehicle. A light shelter wall is provided for preventing light from scattering to the mirror and for having adverse effects on the mirror. The light shelter wall is removably mounted to provide access to the interior of the light source chamber, for example for replacement of the light source. Operation of the winker is clearly and reliably observable by nearby vehicles and persons as well as the driver, thereby reducing areas of non-visibility and promoting traffic safety.

10 Claims, 1 Drawing Sheet

AUTOMOTIVE WINKER DEVICE

BACKGROUND OF THE INVENTION

1. Field of the Invention

This invention relates to an automotive winker device and, more particularly, to a novel automotive winker device, the operation of which can be readily confirmed, thus improving traffic safety and satisfying the user's taste.

Vehicles, from passenger cars to large vehicles such as buses and trucks, are usually provided with winkers (turn signals) to let nearby vehicles or persons know turning to the right or left, change of vehicle lanes, start and stop. The winker is provided at each corner of the front and rear parts of the vehicle body to let the driver's intent be understood by following vehicles, vehicle running in the opposite direction and nearby persons.

However, heretofore it is liable that the position at which the winker is provided falls in a dead angle. Particularly, a driver in a vehicle running parallel or persons waiting at intersections sometimes fail to notice the winker operation, and this constitutes a great cause of traffic accidents. Further, winker operation can be confirmed by the driver by only quasi confirmation from a flickering direction lamp on the driver's dashboard. It is, therefore difficult to make an actual confirmation as to whether the winker is actually operating.

SUMMARY OF THE INVENTION

The invention seeks to solve the above problems inherent in the prior art automotive winkers, and its object is to provide a novel automotive winker device, the operation of which can be reliably confirmed by nearby vehicles and persons and also by the driver himself or herself, thus promoting traffic safety and satisfying user's sense concerning the automotive decoration.

To attain the above object of the invention, there is provided an automotive winker device, which comprises a light source chamber defined in part of a side view mirror cover case, a light source accommodated in the light source chamber, light transmission holes formed in a portion of the cover case defining the light source chamber and also in a portion of the cover case adjacent to the side mirror, the light transmission holes being provided with transparent plates, and a light shelter wall provided at the light transmission hole adjacent to the side view mirror for preventing scattering of light to the side view mirror, the transparent plate at the light transmission hole adjacent to the side view mirror being removably mounted.

With the above construction, flickering of light is produced from part of a member constituting a side view mirror, and operation can be confirmed more as readily compared to the prior art. Particularly, for vehicles running parallel or persons at intersections or signaling spots, the possibility for the flickering to enter the dead angle or to be concealed by objects is reduced to enhance the traffic safety. Particularly, the driver himself or herself can visually confirm the winker operation of his or her own vehicle. Further, with high level vehicles such as buses and trucks, the winker operation substantially coincides with the eyesight level of nearby persons, thus further promoting the safety, and there is no possibility for the light shelter wall to block the flickering light with respect to the sight field of the mirror.

DETAILED DESCRIPTION OF THE PREFERRED EMBODIMENT

In the following description the term "rear facing" and "front facing" means facing toward the rear portion and the front portion, respectively, of the vehicle on which the mirror is mounted.

Referring to the Figures, designated at 1 is a cover case of a door mounted side view mirror. The cover case 1 is provided with a rubber mirror frame 2, to which the back surface of a mirror is bonded. A drive mechanism (not shown) for angularly displacing the mirror is provided substantially at the center of the rubber frame 2.

Figure 3:
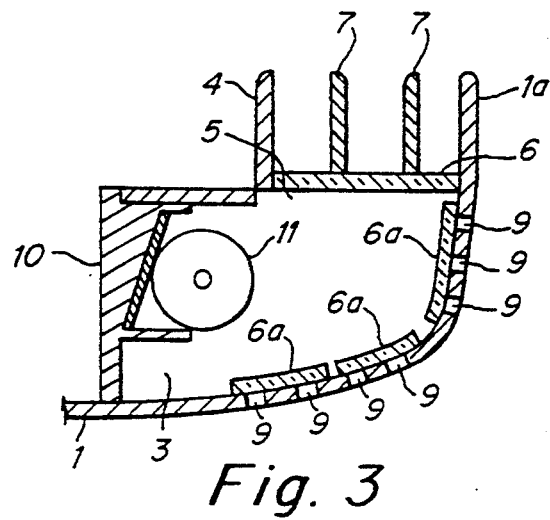
FIG. 3 is a sectional view showing an essential part of the same looking in a different direction.

Near an end of the cover case 1, a light source accommodation chamber 3 FIG. 3 is formed. The cover case 1 is provided with a mirror, which has a somewhat smaller size than the usual size. Alternatively, the mirror may conform to the standard size, while the cover case 1 may be increased in size to provide the light source accommodation chamber 3.

Figure 1:
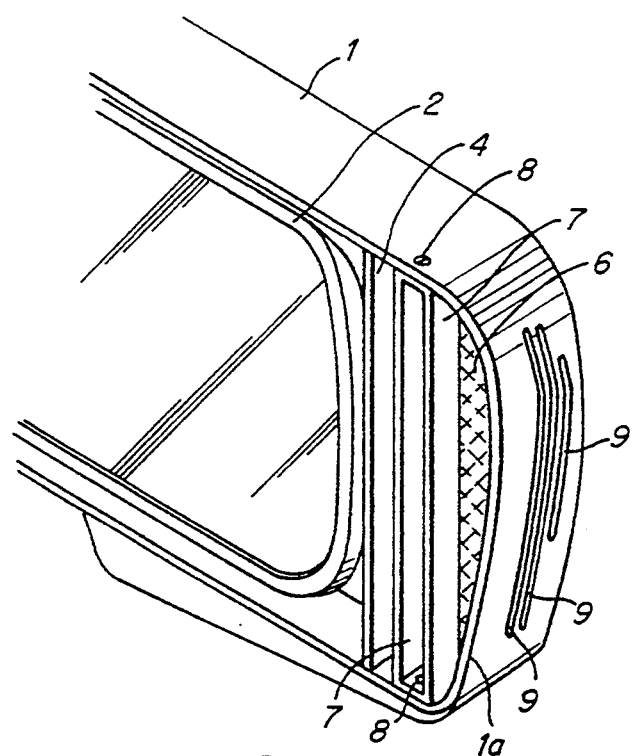
FIG. 1 is a fragmentary perspective view showing a door mirror incorporating the invention.
Figure 2:
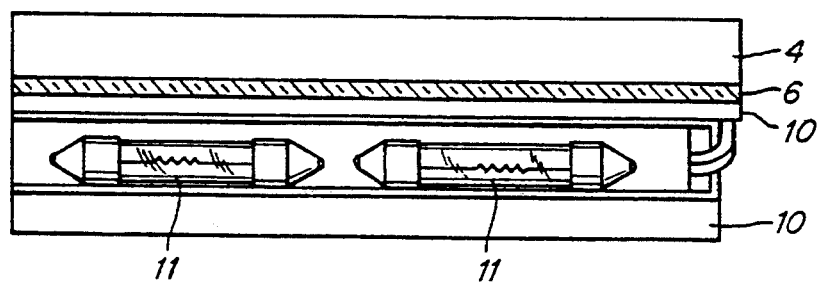
FIG. 2 is a sectional view showing an essential part of the same.

A vertical partitioning member 4 is secured to the cover case 1 at a position thereof between the light source accommodation chamber 3 and the mirror frame 2. A rear facing opening 5 is defined between the partitioning member 4 and the opposed edge portion 1a of the cover case 1. In the opening is fitted a near facing plastic transparent plate 6 of orange color. On the rear facing side of the transparent plate 6 a plurality of rearwardly projecting light shelter walls 7 which also serve as light incidence guides, are provided at a predetermined spacing or pitch. In this embodiment, the light shelter walls 7 constitute a frame, with the top and bottom thereof being removably mounted by screws 8 (FIG. 1) on the cover case 1. The removable mounting structure using the screws 8 is by no means limitative. For example, the frame may be provided with pawls made from a plastic or metal sheet and having a spring character, thus permitting replacement of the light source lamp II, to be described later, by removing the transparent plate 6.

Further, it is possible to permit selection of the directivity of the shelter walls 7 by using a bush or a shaft or by adding a hinge mechanism.

In this embodiment, the side wall surfaces of the light shelter walls 7 are provided with an embossing treatment to absorb light scattered from the lamp (to be described later) so as to prevent adverse effects on the function of the mirror.

The light source accommodation chamber 3 formed in the cover case 1 has its side and rear walls provided with light transmission holes 9 having desired shapes. On the interior side side and of the light transmission holes 9, transparent colored plates 6a (like transparent plate 6 described above); noted above are provided, and flickering of light can be let to the outside from the side and back walls of the door mirror itself.

In the light source accommodation chamber 3, an L-shaped mounting member 10 is provided behind the rubber frame 2. A pair of lamps 11 are provided as light sources on the mounting member 10 such that they direct light into the light source accommodation chamber 3. When a winker switch in the driver's compartment is turned on, winking or flickering of the lamps 11 adjacent to the left or right door mirror is caused, and light is passed out to the outside through the light shelter plates 6 and 6a. It is of course possible to let simultaneous flickering of the lamps 11 adjacent to both the left and right door mirrors be caused when a hazard switch is turned on. This is attainable by connecting the lamps 11 to the usual winkers. The lower wall of the cover case 1, in which the light source accommodation chamber 3, is arranged may be provided with heat radiation holes for escapement of heat from the lamps 11 to the outside.

While the above embodiment of the automotive winker device according to the invention has been described in connection with door mirrors, the invention can of course be applied to side view mirrors provided on the bonnet sides. Further, the light source accommodation chamber 3 need not be provided at the position as in the above embodiment; for example, it is possible to provide elongate light source accommodation chambers above and below the mirrors.

With the above construction of the automotive winker device according to the invention, the driver can visually confirm the operation of the winker device, and the operation can be readily confirmed by nearby vehicles and people, thus providing for safety enhancement. Further, the operation can be reliably confirmed by a vehicle which is running parallel or when waiting for passing because it reduces the dead angle (or hind sport). Thus, an intent of changing the car lane during running at high speed can be promptly transmitted to nearby vehicles. Further, when the operation is executed from high level vehicles such as buses and trucks, it is substantially at the same level as that of the eyesight of nearby persons and can be readily noticed. Moreover, the flickering from the door mirrors and side view mirrors can enhance the fashionability and satisfy the user's taste along with the shapes of the light transmission holes.

I claim:

1. An automotive winker device for use on a motor vehicle, the motor vehicle having a front portion and rear portion, the automotive winker device comprising:
   a side view mirror assembly mountable on a side portion of the vehicle, the side view mirror assembly having a mirror and a cover case to which the mirror is mounted, the mirror being arranged to face rearwardly of the vehicle and so as to be seen by a driver of the vehicle, the cover case having a front facing portion which faces toward the front portion of the vehicle and a rear facing portion which faces toward the rear portion of the vehicle;
   a light source chamber defined in a part of the cover case, the light source chamber having:
   at least one rear facing light transmission opening in a rear facing portion of the cover case defining the light source chamber, said at least one rear facing light transmission opening being adjacent to the mirror, and
   at least one side facing light transmission hole in a sideways outwardly facing portion of the cover case defining the light source chamber, said outwardly facing portion facing sideways away from the vehicle; a light source in said light source chamber;
   at least one rear transparent plate covering said at least one rear facing light transmission opening;
   at least one side facing transparent plate covering said at least one side facing light transmission hole;
   at least one light shelter wall provided at a portion of the cover case which faces toward the of the vehicle, said at least one light shelter wall projecting rearwardly of said mirror toward the rear portion of the vehicle, and rearwardly of said at least one rear transparent plate, for preventing scattering of light passing through said at least one rear facing light transmission opening to the mirror; and
   means for removably mounting said at least one light shelter wall to the cover case adjacent to the mirror, so as to permit removal of said at least one light shelter wall and said at least one rear transparent plate, to thereby provide access to the interior of said light source chamber of the cover case to replace said light source.

2. The automotive winker device of claim 1, wherein said at least one light shelter wall is angularly adjustably mounted to the cover case.

3. The automotive winker device of claim 2, comprising at least two of said light shelter walls spaced apart from each other.

4. The automotive winker device of claim 1, wherein said light source chamber has at least one heat radiation hole therein for permitting passing out of heat from the interior of the light source chamber.

5. The automotive winker device of claim 1, wherein said at least one light shelter wall has a surface treatment thereon to absorb light scattered from the light source.

6. The automotive winker device of claim 5, comprising at least two of said light shelter walls spaced apart from each other.

7. The automotive winker device of claim 1, further comprising a partition member between the mirror and the light source chamber, said partition member projecting toward the rear portion of the vehicle and projecting rearwardly of the mirror toward the rear portion of the vehicle.

8. The automotive winker device of claim 7, comprising at least two of said light shelter walls spaced apart from each other.

9. The automotive winker device of claim 8, wherein said partition member is spaced from said at least two light shelter walls.

10. The automotive winker device of claim 1, comprising at least two of said light shelter walls spaced apart from each other.

* * * * *